Nov. 21, 1944.  W. B. BRONANDER  2,363,224
METHOD OF FORMING AND APPLYING COOLING FINS TO TUBULAR MEMBERS
Filed Aug. 20, 1942  3 Sheets-Sheet 1
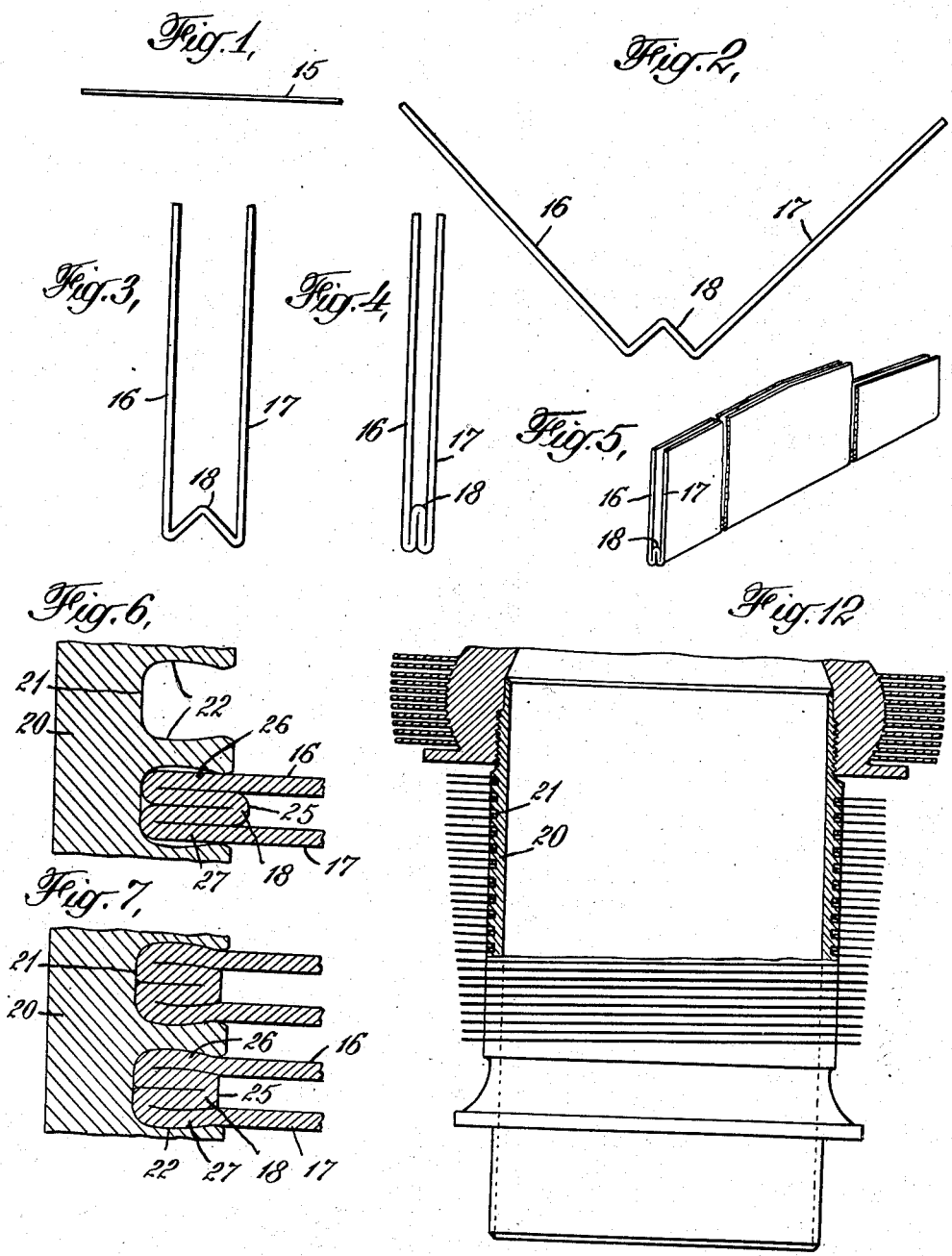
INVENTOR
Wilhelm B. Bronander
BY
Luther W. Hawley
ATTORNEY

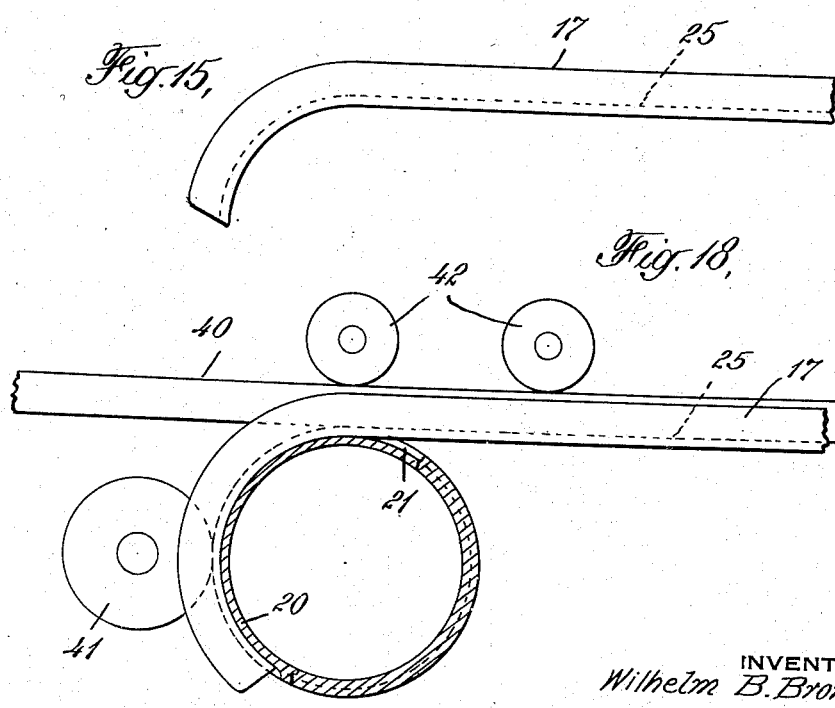

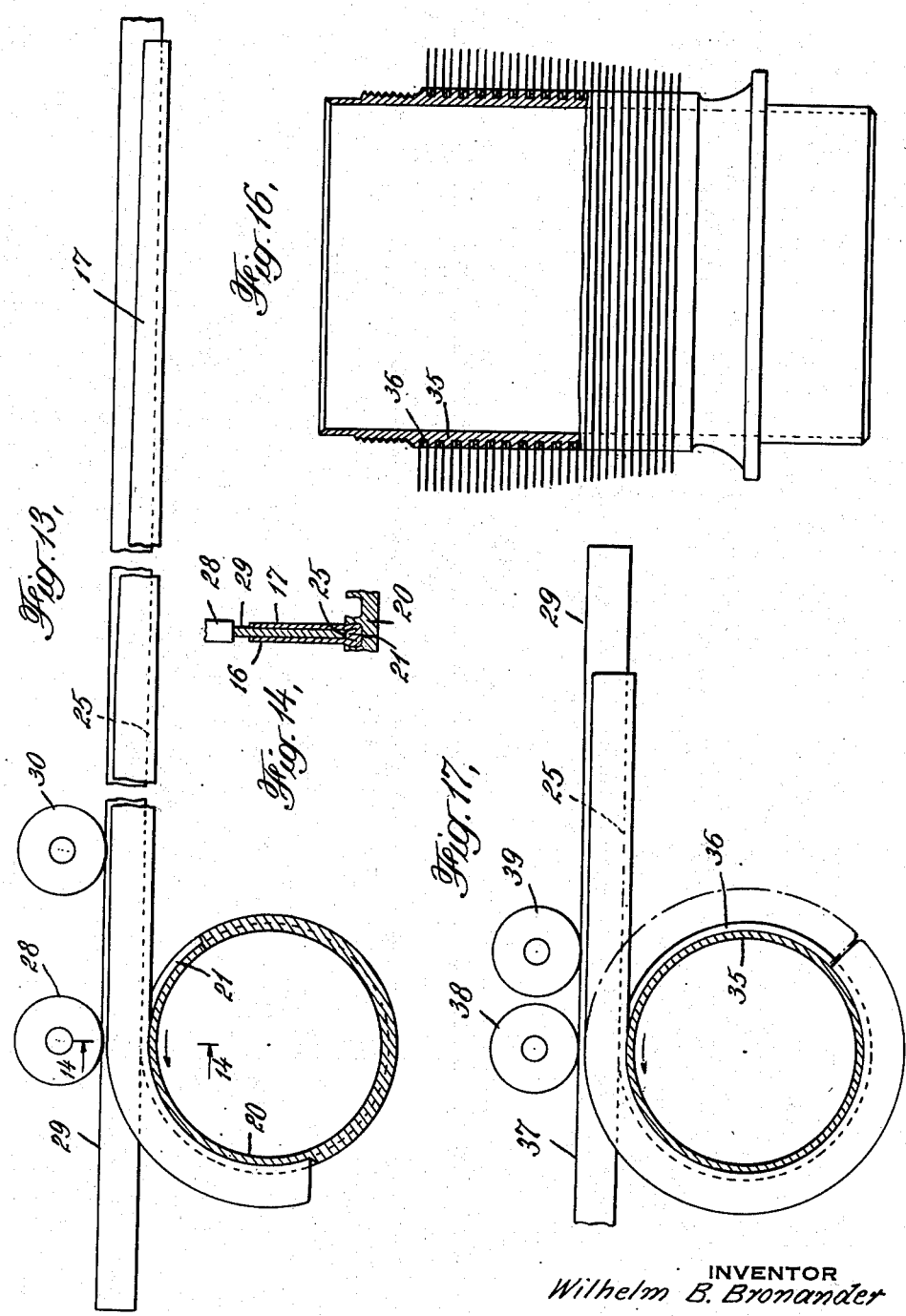

Patented Nov. 21, 1944

2,363,224

UNITED STATES PATENT OFFICE 2,363,224

METHOD OF FORMING AND APPLYING COOLING FINS TO TUBULAR MEMBERS

Wilhelm B. Bronander, Montclair, N. J.

Application August 20, 1942, Serial No. 455,451

5 Claims. (Cl. 29—157.3)

This invention relates to a method of forming and applying a cooling fin or heat exchange element to a tubular member or cylinder.

Cooling fins are usually formed integral with the tube or cylinder or are brazed or soldered thereto. The casting of fins integral with the cylinder involves the use of expensive patterns and fins so cast are brittle. The brazing, welding or soldering of the fins to the tubular members or cylinders is expensive and time consuming and does not always result in a rigid and efficient joint.

This invention has for its salient object to provide a simple, practical and efficient method of forming and applying a cooling fin to a tube, cylinder or other member to be cooled in such a manner that the method can be expeditiously carried out and will result in forming a firm and rigid connection without requiring brazing, soldering or welding.

Another object of the invention is to provide a joint between a cooling fin and cylinder or tube so formed that heat will be efficiently conducted from the tube or cylinder to the fin.

Further objects of the invention will appear from the following specification taken in connection with the drawings which form a part of this application, and in which Fig. 1 is an edge view of a strip of material used for forming the cooling fin;

Fig. 2 is an enlarged elevation illustrating the first step in the method of forming the cooling fin from the strip shown in Fig. 1;

Fig. 3 illustrates the next step in the formation of the cooling fin;

Fig. 4 is an end elevational view showing the cooling fin in its completed form before it is applied to the tube or cylinder;

Fig. 5 is a perspective view of the fin shown in Fig. 4;

Fig. 6 is a partial sectional view illustrating the cooling fin applied to the groove of a cylinder;

Fig. 7 is a view similar to Fig. 6 but showing the cooling fin compressed and secured in the groove;

Fig. 8 is a view similar to Fig. 4 but showing a modified form of fin construction;

Fig. 9 is a view similar to Fig. 7 but showing the fin shown in Fig. 8 anchored in the groove;

Fig. 10 is an elevation showing, in edge view, another form of fin embodying the invention;

Fig. 11 shows, in section, the fin of Fig. 10 anchored in the groove;

Fig. 12 is an elevational view, partly in section, showing an engine cylinder having a cooling fin constructed and applied thereto in accordance with the invention, the cooling fin being wound spirally around the cylinder;

Fig. 13 is a diagrammatic elevational view, partly in section, illustrating the method of applying the cooling fin to the cylinder shown in Fig. 12;

Fig. 14 is a transverse section taken substantially on line 14—14 of Fig. 13 looking in the direction of the arrows;

Fig. 15 is an elevation of the entering end of the fin bent to conform to the curvature of the groove;

Fig. 16 is a view similar to Fig. 12 but illustrating a cooling fin construction in which the fin is applied circumferentially around the cylinder but not spirally;

Fig. 17 is a diagrammatic view, partly in section, illustrating the method of applying the fin to the cylinder shown in Fig. 16; and Fig. 18 is a view similar to Fig. 13 but showing another form of apparatus for applying the fin to the cylinder groove.

The invention briefly described consists of forming a double walled cooling fin from a strip of material, the walls being substantially parallel and being formed by bending the strip intermediate the longitudinal edges thereof. Material is provided between the walls at the connected edges thereof and the double wall fin is then applied to a peripheral groove formed in the cylinder, tube or other member on which the fin is to be mounted. This groove preferably has slightly concaved or inwardly flared walls or the walls may be irregular in form to provide a better gripping or engaging surface for the fin. The groove may be spirally formed on the outer surface of the cylinder or a series of parallel grooves may be formed therein. After the double walled fin is inserted in the groove with the closed edge of the fin disposed at the bottom of the groove, the material disposed at the bend of the fin between the walls is compressed between the bottom of the groove and a bar held against the outer edge of this material. No pressure is applied to the outer edges of the fin walls.

As pressure is applied, the material between the closed edges of the fin or between the bend therein is forced inwardly, thus exerting a lateral pressure on the inner ends of the walls, forcing the walls of the fin laterally into tight gripping engagement with the walls of the groove, thereby forming an efficient heat conducting joint and anchor between the cylinder or tube and the cooling fin.

Further details of the invention will appear from the following description.

In the particular embodiment of the invention illustrated in Figs. 2–7 inclusive of the drawings, the fin is formed from a substantially flat strip 15 of suitable material, such as aluminum. This strip is first bent or otherwise shaped into the form of an open W, as shown in Fig. 2, comprising walls 16 and 17 and an intermediate inverted V-shaped portion 18. The walls are next bent into parallel relation, as shown in Fig. 3, and the portion 18 is then compressed, as shown in Fig. 4, to form the double walled fin. This fin is illustrated in perspective at Fig. 5.

The cooling fin may be applied to a cylinder wall 20 of an internal combustion engine, as shown in Fig. 12. The outer surface of the cylinder wall 20 has formed therein a spiral groove 21, the walls of the groove, as shown in Figs. 6 and 7, being preferably slightly concaved, as shown at 22.

The closed edge or bend of the double walled fin is inserted in the groove 21 of the cylinder wall 20, the cylinder preferably being mounted and rotated in the direction of the arrow shown in Fig. 13. The entering end of the fin may, if desired, be initially secured in the groove by manually tamping the outer end 25 of the portion 18 of the fin, the tamping pressure being exerted in a direction toward the base of the groove 21. This pressure forces the material in the non-radiating portion 18 of the fin into the groove and forces the inner end portions 26 and 27 of the walls 16 and 17 laterally into the concaved, irregular or deformed walls 22 of the groove, thus firmly anchoring the fin in the groove and forming a tight gripping engagement with the walls of the groove.

After the entering portion of the strip has thus been anchored, the remaining portion 18 of the strip is forced into the groove by pressure between a flat strip 29 and the bottom of the groove 21. Strip 29 is disposed between the walls 16 and 17 of the fin and held down in operation by a roller 28 and in engagement with the portion 24 of the inverted V 18 of the cooling fin. A second roller 30 guides the strip 29 and holds it in position. The strip 29 may also be used to initially anchor the strip instead of the manual tamping. The fin is preferably initially bent as shown in Fig. 15, to conform at its entering end to the curvature of the groove.

It will be evident that as the cylinder or tube is rotated in the direction of the arrow, the double walled cooling fin will be drawn into the spiral groove, it being understood that the cylinder is free to move longitudinally as the cooling fin is wound spirally in the groove 21 and that no pressure is exerted on the outer edges of the fin walls 16 and 17.

If desired, the cylinder wall 35, as shown in Fig. 16, may be provided with a series of parallel grooves 36 instead of with a spiral groove as shown in Fig. 12. With this form of construction, a series of parallel cooling fins is secured to the cylinder in the manner shown in Fig. 17. In this form of construction the entering end of the cooling fin is secured in the same manner as that above described and pressure on the portion 25 of the cooling fin is exerted between a flat strip 37 similar to the strip 29 shown in Fig. 13 and the bottom of the groove. This strip is forced between the walls 16 and 17 of the cooling fin and against the portion 25 thereof by a pressure roller 38 similar to the roller 28 shown in Fig. 13. A second roller 39 guides the strip 27 and prevents the strip from being thrown upwardly or out of alinement.

If desired, the fin may be placed in the groove by a strip 40, as shown in Fig. 18, and the material between the fin walls may be compressed by a roller 41.

Figs. 8–11 inclusive, illustrate other fin constructions embodying the invention. In Figs. 8 and 9 the intermediate or inverted V portion 45 of the W has disposed therein a bar 46 of deformable material, preferably metal.

As the portion 45 is compressed in the manner hereinbefore described, the fin walls are spread or forced laterally into close, gripping engagement with the groove walls, as shown in Fig. 9.

In Figs. 10 and 11 the bar 47 is tapered and may be of harder material or metal. As the portion 48 of the fin is compressed, the fin walls are forced laterally to grip the walls of the groove.

Although particular mention has been made of applying the fin to a cylinder or tube, it should be understood that the method may be used equally well in applying a cooling fin to any part or member to be cooled.

From the foregoing description it will be evident that a simple, practical and efficient method of forming and applying a cooling fin to a tube or cylinder has been worked out and that this method will provide a connection or joint between the fin and the cylinder or tube that will firmly anchor the fin in position and efficiently conduct the heat from the cylinder to the fin.

Although certain specific embodiments of the invention have been particularly shown and described, it will be understood that the method is not limited to the particular details set forth or to the apparatus diagrammatically illustrated, but that changes in the method may be made without departing from the spirit or scope of the invention as expressed in the following claims.

What I claim is:

1. The method of forming and securing a radiating fin to a member which consists of forming a strip of material intermediate the longitudinal edges thereof to form substantially parallel connected walls, forming a groove in the member, inserting the closed edge of the double walled fin in said groove, the inner connected edge of the double walled fin being formed of folded material integral therewith and folded back against the walls and substantially filling the space between the walls at the inner edge thereof, and forcing the inner portions of said fin walls laterally into tight gripping engagement with the walls of the groove by pressure against said folded material between the fin walls and between the bottom of the groove and inwardly acting pressure means.

2. The method of forming and securing a radiating fin to a member which consists of forming a strip of material intermediate the longitudinal edges thereof into W-shape with separated substantially parallel walls and with the intermediate portion of the W flattened and disposed between the walls at the connected edge portions thereof, inserting the closed edge of the double walled fin in the groove and forcing the fin walls laterally into tight gripping engagement with the groove walls by pressure exerted against the portion of the W intermediate the fin walls.

3. The method of providing a member with radiating fins which consists of forming a plurality of grooves in the member, forming double walled fin units with substantially parallel, spaced walls connected at one edge of each wall by a bridge of compressible material integral with the walls extending outwardly from the inner edges of the walls and substantially filling the space therebetween at the connected edge portions to be inserted in the grooves, inserting the connected edge of a fin unit in each groove, and forcing said walls laterally by pressure against the outer portion of said compressible material directed toward the base of the groove to compact the compressible material and to anchor the walls in the grooves.

4. The method of providing a member with radiating fins which consists of forming a plurality of grooves in the member, forming double walled fin units with substantially parallel, spaced walls connected at one edge of each wall by folded compressible material integral with the walls and extending in a direction toward the outer edges of said fins and substantially filling the space therebetween at the connected edge portions to be inserted in the grooves, inserting the connected edge of a fin unit in each groove, and forcing said walls laterally by pressure against the outer portion of said compressible material directed toward the base of the groove to compact the compressible material and to anchor the walls in the grooves.

5. The method of forming and securing a radiating fin to a grooved member to be cooled which consists of inserting in the groove substantially parallel fin walls, the bottom portion of each wall having an integral portion folded back against said wall, said folded portions substantially filling the space between the bottom portions of the walls disposed between the walls of the groove and forcing the fin walls laterally into tight gripping engagement with the groove walls by inward pressure directed against said folded portions.

WILHELM B. BRONANDER.